United States Patent [19]
Koseki et al.

[11] Patent Number: 5,220,252
[45] Date of Patent: Jun. 15, 1993

[54] FOCUS VOLTAGE CORRECTION CIRCUIT FOR CATHODE RAY TUBES

[75] Inventors: Shogo Koseki; Mitsuhisa Nakagawa; Nobuaki Nishijima, all of Tokyo, Japan

[73] Assignee: Nippon Chemi-Con Corporation, Tokyo, Japan

[21] Appl. No.: 460,081

[22] PCT Filed: Jun. 8, 1989

[86] PCT No.: PCT/JP89/00585
§ 371 Date: Jan. 18, 1991
§ 102(e) Date: Jan. 18, 1991

[30] Foreign Application Priority Data
Jun. 10, 1988 [JP] Japan .................................. 63-141614

[51] Int. Cl.[5] .............................................. H01J 29/58
[52] U.S. Cl. ..................................................... 315/382
[58] Field of Search .......................... 315/382, 382.1

[56] References Cited
U.S. PATENT DOCUMENTS
4,728,868  3/1988  Ishikawa et al. .................... 315/382
4,961,031  10/1990  Nakagawa et al. ................. 315/382

Primary Examiner—Theodore M. Blum
Attorney, Agent, or Firm—Young & Thompson

[57] ABSTRACT

A focus voltage correction circuit for cathode ray tubes is disclosed in which a flyback pulse is generated by switching a supply voltage to be applied to a primary side of a flyback transformer, and the flyback pulse being is rectified and smoothed so as to develop a focus voltage in cathode ray tubes. A correction voltage capable of minimizing an error in the focus voltage to be caused by an error in the supply voltage is superimposed on the flyback pulse. In addition, the focus voltage correction circuit for cathode ray tubes may be provided with a device for regulating the correction voltage such that the focus voltage regulation can be performed.

9 Claims, 2 Drawing Sheets

FOCUS VOLTAGE CORRECTION CIRCUIT FOR CATHODE RAY TUBES

TECHNICAL FIELD

This invention relates to a focus voltage correction circuit for cathode ray tubes (hereinafter referred to as "CRT"), and more particularly to a focus voltage correction circuit for minimizing a resolution change due to an error in a supply voltage in CRTs.

BACKGROUND OF THE INVENTION

Conventionally, the CRT of a well known type has an electrode structure consisting of a cathode K, a primary grid G1, a secondary grid G2 and an anode A. By using the CRT of this type, an applicant of this invention has developed such a circuit means that control signals like a video signal is entered to the cathode K while a focus voltage developed on a secondary side winding of a flyback transformer is applied to the anode A, and then has filed Japanese Patent Applications Nos. 62-93208 and 62-93209. In the circuit means, a horizontal drive pulse is supplied to the primary side of the flyback transformer so that a flyback pulse resonated by a resonance capacitor and a deflecting yoke during the horizontal retrace period is supplied to a primary side winding of the flyback transformer while the deflecting yoke is driven. To this end, a necessary focus voltage is generated on the secondary side winding of the flyback transformer.

In the case the flyback transformer has an unstable supply voltage on the primary side thereof, an error caused due to a supply voltage variation on the primary side gives influences through the flyback transformer on an output generated on the secondary side.

High voltage which is applied to the anode of the CRT (hereinafter referred to as "focus voltage") is under the influence of the error. Even though the primary side supply voltage has only the error of ±0.2V, an anode end connected to the secondary side will have the error of about ±80V. To this end, a fluctuation of a focal point is caused to change a beam spot diameter, resulting in ill effect.

In order to prevent the influence of the error mentioned above, there is conventionally provided such a means that a voltage sufficiently stabilized by using a three-terminal regulator is used as the primary side supply voltage.

However, with the conventional means for providing the stabilized supply voltage to be used as the supply voltage for the primary side winding, power consumption is increased as a result of current consumption in the three-terminal regulator per se and of its voltage drop between input and output potentials.

Further, stabilization of only of the primary side supply voltage by means of the three-terminal regulator cannot perform a fine adjustment of the focal point.

DISCLOSURE OF THE INVENTION

An object of the present invention is to provide a focus voltage correction circuit for CRTs being capable of correcting an error in a focus voltage occurring due to an error in a primary side supply so as to easily limit a resolution change in CRTs to a minimum level.

Another object of the invention is to provide the focus voltage correction circuit for CRTs which can regulate a value of the focus voltage with a corrected error so as to regulate the focus voltage in CRTs, while being capable of correcting the error in the focus voltage occurring due to the error in the primary side supply so as to easily limit the resolution change in CRTs to a minimum level.

According to the invention, there is provided the focus voltage correction circuit for CRTs in which a flyback pulse is generated by switching a supply voltage to be applied to a primary side of a flyback transformer, the flyback pulse being rectified and smoothed so as to develop a focus voltage in CRTs, and in which a correction voltage being capable of reducing an error in the focus voltage to be caused by an error in the supply voltage is superimposed on the flyback pulse. In the thus configured focus voltage correction circuit for CRTs, even though an error in the focus voltage on the secondary side of the flyback transformer is caused as a result of an error in the supply voltage generated on the primary side of the flyback transformer, the error can be reduced so as to maintain the correct focus voltage. Therefore, a fluctuation of a focal point in CRTs is limited to minimize a resolution change in CRTs.

Further, according to the invention, there is provided the focus voltage correction circuit for CRTs in which a flyback pulse is generated by switching a supply voltage to be applied to a primary side of a flyback transformer, the flyback pulse being rectified and smoothed so as to develop a focus voltage in CRTs, and in which a voltage-varying means for determining a variable input voltage in an amplifier is provided on an input side of the amplifier such that the focus voltage in CRTs can be variably determined by an output voltage in the amplifier. Since in the focus voltage correction circuit the focus voltage is determined by the output voltage in the amplifier, a variable resistor for the focus voltage regulation to be used as the voltage-varying means is not given such high voltage as applied to the output side of the amplifier.

In addition, according to the invention, there is also provided the focus voltage correction circuit for CRTs in which a flyback pulse is generated by switching a supply voltage to be applied to a primary side of a flyback transformer, the flyback pulse being rectified and smoothed so as to develop a focus voltage in CRTs, and in which a correction voltage being capable of reducing an error in the focus voltage to be caused by an error in the supply voltage is superimposed on the flyback pulse, a value of the correction voltage being regulated so as to regulate the focus voltage in CRTs. To this end, the error in the supply voltage to be generated on the primary side of the flyback transformer can be reduced so as to constantly maintain the correct focus voltage. Consequently, a fluctuation of a focal point of CRTs is limited so that a fine adjustment of the focal point and a minimum change in resolution of CRTs can be realized.

Moreover, according to the invention, there is preferably provided the focus voltage correction circuit for CRTs in which a flyback pulse is generated by switching a supply voltage to be applied to a primary side of a flyback transformer, the flyback pulse being rectified and smoothed so as to develop a focus voltage in CRTs, and in which the supply voltage is applied to an inversion amplifier, an output of the inversion amplifier being superimposed on the flyback pulse so as to reduce an error in the focus voltage to be caused by an error in the supply voltage.

BRIEF DESCRIPTION OF THE DRAWINGS

Embodiments of a focus voltage correction circuit for cathode ray tubes (CRTs) according to the invention is described hereinafter with reference to the accompanying drawings in which.

THE MOST PREFERRED EMBODIMENTS OF THE INVENTION

Figure 1:
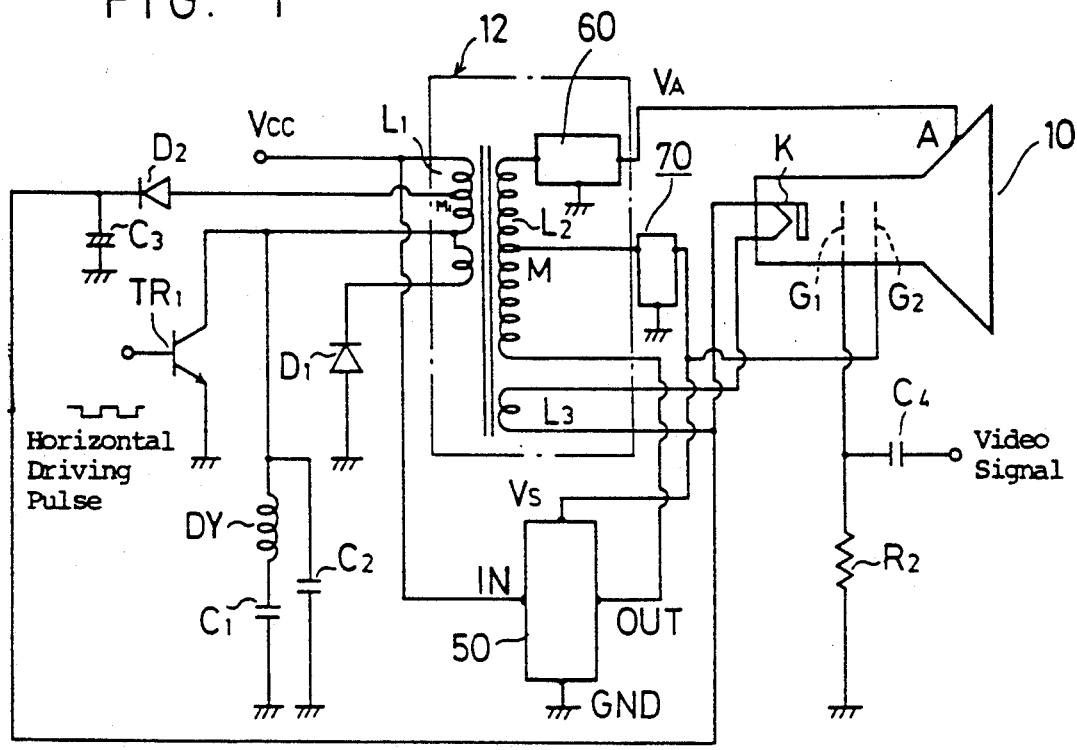
FIG. 1 is a circuit diagram of one embodiment according to the invention.

In FIG. 1, since an anode electrode is used as a focus electrode, a focus voltage is hereinafter referred to as an anode voltage. Referring now to FIG. 1 a magnetic focusing CRT 10 consists of a cathode K, a first grid $G_1$, a second grid $G_2$ and an anode A. A primary side winding $L_1$ of a flyback transformer 12 is connected to a horizontal output transistor $TR_1$ which generates a horizontal drive pulse, a deflecting yoke DY, a blocking capacitor $C_1$, a resonance capacitor $C_2$ and a damper diode $D_1$. An intermediate tap $M_1$ is provided in the primary side winding $L_1$ and connected to a winding $L_3$ of the flyback transformer 12 and the cathode K through a smoothing circuit which consists of a rectifier diode $D_2$ and a smoothing capacitor $C_3$. A voltage doubler rectifier circuit 60 is connected to the high voltage side of a secondary side winding $L_2$ of the flyback transformer 12 and boosts an output voltage of the flyback transformer. A rectifier circuit 70 is connected to an intermediate tap M provided in the secondary side winding $L_2$ and produces a second grid voltage.

In accordance with this invention, there is provided an amplifier 50 for which the second grid voltage produced in the rectifier circuit 70 is used as a power source $V_S$. An input terminal IN of the amplifier 50 is connected to the supply voltage $V_{CC}$ side for the primary side winding $L_1$ while an output terminal OUT thereof is connected to the low voltage side of the secondary side winding $L_2$. A focus voltage $V_A$ may be used through a bleeder resistor as the power source $V_S$ for the amplifier 50. In this case, a power consumption is disadvantageously increased. The power source $V_S$ should have such a voltage range that an error in the focus voltage generated as a result of the error in the primary side supply voltage is properly correctable. In the CRT, the power source for the second grid has the voltage range.

The output voltage to be produced in the amplifier 50 is superimposed on a voltage which is induced in the secondary side winding $L_2$ of the flyback transformer 12. The thus obtained focus voltage $V_A$ is applied to the anode A of the CRT 10.

The rectifier circuit 70 which consists of the blocking capacitor, the rectifier diode, a clamping diode and the smoothing capacitor (not shown) operates so as to smooth an alternating current component of a pulse which is generated on the secondary side of the flyback transformer 12.

A video signal is supplied through a capacitor $C_4$ and a resistor $R_2$ to the first grid $G_1$ of the CRT 10.

In the aforementioned focus voltage correction circuit, the error in the focus voltage caused by the error in the primary side supply voltage is corrected so as to be offset by an output voltage developed in the amplifier 50. Accordingly, the focus voltage is rendered stable so that a fluctuation of a focal point, i.e., a change of resolution can be eliminated.

Operation of the amplifier 50 will be described hereinafter according to an inner circuit diagram shown in FIG. 2.

Figure 2:
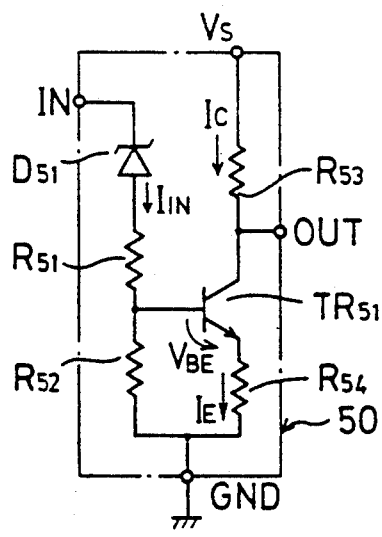
FIGS. 2 to 4 are circuit diagrams of various embodiments of an inversion amplifier shown in FIG. 1.

In FIG. 2, the amplifier 50 is an inversion amplifier consisting of a transistor $TR_{51}$ for inversion amplification, resistors $R_{51}$-$R_{54}$ and a zener diode $D_{51}$. A base of the transistor $TR_{51}$ is connected to a ground terminal GND through the resistor $R_{52}$ while being connected to an input terminal IN through a series circuit consisting of the zener diode and the resistor $R_{51}$. An emitter of the transistor $TR_{51}$ is connected to the ground terminal GND through the resistor $R_{54}$. A collector of the transistor $TR_{51}$ is connected to a supply terminal $V_S$ through the resistor $R_{53}$ while being connected to an output terminal OUT. The thus configured inversion amplifier 50 is included in the focus voltage correction circuit as shown in FIG. 1. The error in the primary side supply voltage $V_{CC}$ is distributed through the zener diode $D_{51}$ in a resistance ratio of the resistor $R_{51}$ to $R_{52}$ before being entered to the base of the transistor $TR_{51}$. A voltage amplification rate in the inversion amplifier 50 is represented as a ratio of the resistors respectively connected to the collector and the emitter. Namely, an amplitude of an input voltage is increased by $R_{53}/R_{54}$ times at the output terminal OUT. In this case, a phase of an output voltage is dislocated by 180 degrees against that of the input voltage, i.e. it is inverted per se, and appears as an error at the output terminal OUT.

An error in an output voltage on the secondary side of the flyback transformer 12 varies in proportion to the error in the primary side supply voltage. If an amplitude of an error in the voltage $V_{OUT}$ to be developed at the output terminal OUT due to the error in the primary side supply voltage $V_{CC}$ equals that of an error in the focus voltage $V_A$, the error in the focus voltage $V_A$ can be offset thereby. One example will be concretely described hereinafter by using numeral values.

In the following, to clarify a concept of the present invention, exemplary numerals are given to the respective factors or terms, i.e., 5V for the primary side supply voltage $V_{CC}$, ±2V for the error, 330V for the second grid voltage to be applied to the power supply $V_S$, 2200V for the focus voltage $V_A$ to be supplied to the anode, 3.6V for a zener voltage $V_{ZD}$ of the zener diode $D_{51}$, 0.5V for a base-emitter forward voltage $V_{BE}$ in the transistor $TR_{51}$, and 5K ohm, 5K ohm, 3.9M ohm and the respective resistors $R_{51}$, $R_{52}$, $R_{53}$ and $R_{54}$. In such a case, if a current flowing through the collector is defined as $I_C$, the voltage $V_{OUT}$ to be developed at the output terminal OUT of the transistor $TR_{51}$ is given by the equation (1) in the case of $V_{CC}=5V$ (constant).

$$V_{OUT}=V_S-I_C\cdot R_{53} \quad (1)$$

A base input voltage $V_B$ is defined as:

$$V_B=(V_{CC}-V_{ZD})\cdot R_{52}/(R_{51}+R_{52}) \quad (2)$$

Therefore, a current $I_E$ flowing through the emitter is given by:

$$I_E=(V_B-V_{BE})/R_{54} \quad (3)$$

If an amplification rate of the emitter ground current of the transistor $TR_{51}$ is sufficiently high, a base current is negligible, whereby the following approximation is obtained.

$$I_C \approx I_E \quad (4)$$

Therefore, $V_{OUT}$ is calculated as follows by substituting the above numeral values into equations (1)–(4):

$$V_{OUT} \approx 135V \quad (5)$$

If $V_{CC}$ has the error $\pm 0.2V$ relative to a reference voltage 5V, an error $\pm 0.1V$ is applied to the base input voltage $V_B$ of the transistor $TR_{51}$ according to the equation (2).

Further, a voltage error in the power source $V_S$ on the secondary side of the flyback transformer 12 is proportional to the error in the primary side supply voltage $V_{CC}$ and given as follows:

$$330 \times (\pm 0.2/5) \approx \pm 13 \quad (V)$$

Therefore, a voltage error to be generated on the output terminal OUT of the inversion amplifier 50 is given as $\pm 85V$ by adding the error $\pm 13V$ in the power source $V_S$ to an error $\pm 98V$ in the base input voltage $V_B$ amplified in the resistor ratio $R_{53}/R_{54}$.

On the other hand, an error in the focus voltage $V_A$ is found as follows in the same manner as the power source $V_S$:

$$(2200-135) \times (\pm 0.2/5) \approx \pm 83 \quad (V).$$

However, the error $\pm 83V$ in the focus voltage is offset by superimposing the voltage error $\pm 85V$ generated at the output terminal OUT of the inversion amplifier 50, on the low voltage side of the secondary side winding $L_2$. Thus, the voltage amplification rate of the inversion amplifier 50 can be predetermined by selecting appropriate resistance values for the resistors $R_{53}$ and $R_{54}$ so that the voltage error generated on the output terminal OUT of the inversion amplifier 50 can be easily equalized to the error in the focus voltage. As a result, the error in the focus voltage 2200V caused by the error in the primary side supply voltage is corrected and rendered extremely small, i.e. approximately $\pm 2V$ ($\pm 0.1\%$).

Power consumption of the inversion amplifier 50 included in the focus voltage correction circuit according to the present invention will be described hereinafter as compared with that of a conventional means.

The power consumption of the inversion amplifier 50 is given by the following equation:

$$V_{CC} I_{IN} + (V_S - V_{OUT})^2 / R_{53} \quad (6)$$

Under the condition in which the above numeral values are used, the power consumption of the inversion amplifier circuit 50 equals to only about 10 mW. On the other hand, in conventional method in which a three-terminal regulator is used to temporarily stabilize the power source, in the case of 3 mA current self-consumption, 0.3V voltage drop between input and output potentials and 80 mA current consumption, the power consumption reaches 39 mW. Accordingly, the focus voltage correction circuit of the invention can realize the excellent power consumption.

Figure 3:
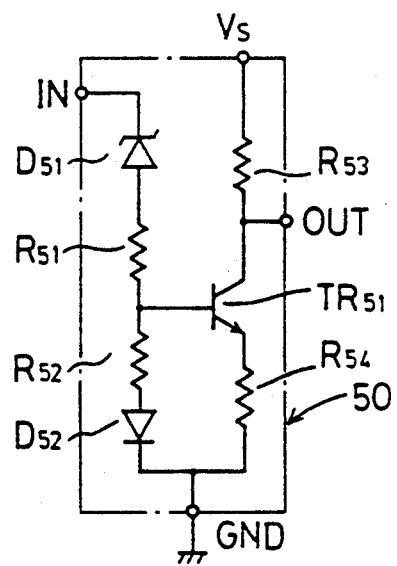

FIG. 3 is a circuit diagram of another embodiment of the amplifier 50 shown in FIG. 1. FIG. 3 differs from FIG. 2 in such a circuit configuration that a base of a transistor $TR_{51}$ is connected to a ground terminal GND through a series circuit comprising a resistor $R_{52}$ and a diode $D_{52}$. The diode $D_{52}$ operates so as to compensate a current variation in a collector of the transistor $TR_{51}$ which is caused by a temperature change in a base-emitter voltage $V_{BE}$ in the transistor $TR_{51}$.

Figure 4:
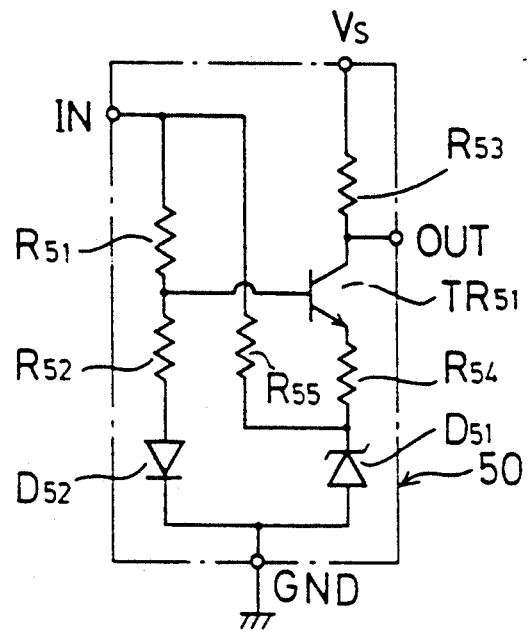

FIG. 4 is a circuit diagram of still other embodiment of the amplifier 50. A base of a transistor $TR_{51}$ is connected to a ground terminal GND through a series circuit comprising a resistor $R_{52}$ and a diode $D_{52}$ and to an input terminal IN through a resistor $R_{51}$. A collector of the transistor $TR_{51}$ is connected to a power source $V_S$ through a load resistor $R_{53}$ and to an output terminal OUT. An emitter of the transistor $TR_{51}$ is connected to the input terminal IN through a series combination of resistors $R_{54}$ and $R_{55}$. The ground terminal GND is connected through a zener diode $D_{51}$ to a conjunction point of the resistors $R_{54}$ and $R_{55}$. To this end, an input impedance which is increased due to the zener diode $D_{51}$ provided on the emitter side is limited to a low level by connecting the resistor $R_{55}$ to the conjunction point of the resistors $R_{54}$ and the zener diode $D_{51}$. In addition, the inversion amplifier 50 can perform a compensation of an error in the focus voltage.

Figure 5:
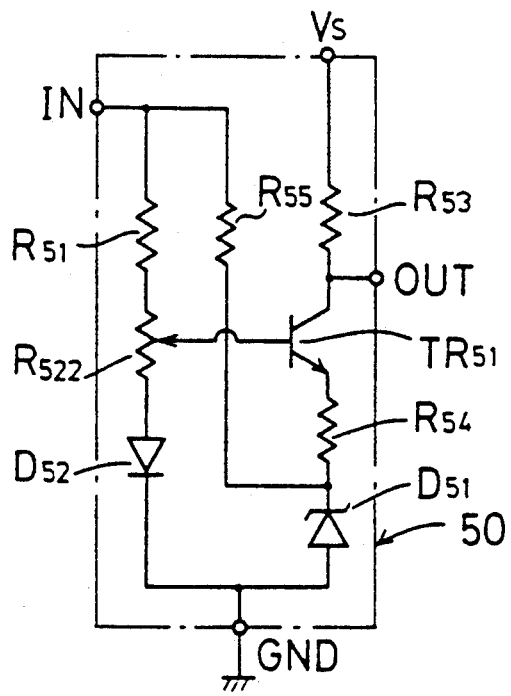
FIG. 5 is a circuit diagram of another preferred embodiment of the amplifier shown in FIG. 1 which can perform a fine adjustment of a focal point.

FIG. 5 is a circuit diagram of another embodiment of a focus voltage amplifier for cathode ray tubes according to the invention being capable of performing fine adjustment of a focus voltage and being suitable for use as the amplifier 50 shown in FIG. 1. In FIG. 5, a base of a transistor $TR_{51}$ for inversion amplification is connected to a ground terminal GND through a series circuit comprising a variable resistor $R_{522}$ and a diode $D_{52}$ and to an input terminal IN through a series combination of the variable resistor $R_{522}$ and a resistor $R_{51}$. A collector of the transistor $TR_{51}$ is connected to a power source $V_S$ through a load resistor $R_{53}$ and to an output terminal OUT. An emitter of the transistor $TR_{51}$ is connected to the input terminal IN through a series combination of resistors $R_{54}$ and $R_{55}$. The ground terminal GND is connected through a zener diode $D_{51}$ to a conjunction point of the resistors $R_{54}$ and $R_{55}$. In this embodiment, the variable resistor $R_{522}$ is used as a resistor to be connected to the base of the transistor $TR_{51}$ so that a direct current operating-voltage of an output voltage Vout can be changed. Therefore, an error in a focus voltage $V_A$ resulting from the error in a primary side supply voltage $V_{CC}$ can be compensated. Further, a fine adjustment of the focus voltage $V_A$, i.e. a focus voltage regulation can be performed.

Generally, it is required to provide the variable resistor for the focus voltage regulation which is resistible to high voltage covering the range of a few hundred volts. The variable resistor $R_{522}$ for the focus voltage regulation operates such that a collector voltage in the transistor $TR_{51}$ can be amplified in the range of a few hundred volts by regulating a base voltage in the transistor $TR_{51}$ in the range of only a few volts. To this end, the focus voltage regulation can be realized. Thus, the variable resistor for the focus voltage regulation shown in FIG. 5 is considerably safe and reliable without high voltage.

An input impedance which is increased due to the zener diode $D_{51}$ arranged on the emitter side of the transistor $TR_{51}$ is limited to a low level by connecting the resistor $R_{55}$ to the conjunction point of the zener diode $D_{51}$ and the resistor $R_{54}$. The diode $D_{52}$ operates so as to compensate a current variation in a collector of the transistor $TR_{51}$ which is caused by a temperature change in a base-emitter voltage $V_{BE}$ in the transistor $TR_{51}$.

Although a bipolar transistor is used for the amplifier 50 as described in this embodiment, a MOS FET may be also employed in such an amplifier.

INDUSTRIAL APPLICABILITY OF THE INVENTION

As is obvious from the aforementioned embodiments according to the invention, the disclosed invention provides a circuit means for superimposing an output voltage in an amplifier to which an error in a primary side supply voltage is supplied, on a secondary side winding so that an error in a focus voltage in a cathode ray tube (CRT) occurring due to the error in the primary side supply voltage can be compensated. Therefore, the stable focus voltage can be obtained, resulting in no variation in a focal point and the minimum change in resolution.

Furthermore, the disclosed invention provides a voltage-varying means on an input side of an amplifier such that a focus voltage can be determined by an output voltage in the amplifier. For this reason, a variable resistor for a focus voltage regulation which is used as the voltage-varying means is efficiently safe and reliable without such a high voltage as is developed on an output side of the amplifier.

In addition, the inversion amplifier according to the invention can realize a correction in the focus voltage with a lower power consumption compared with a conventional means using a three-terminal regulator.

Also, a correction voltage for correcting the error in the focus voltage caused by the error in a primary side supply voltage is capable of being regulated so that a variation in a focal point can be minimized and a fine adjustment can be performed.

Although the invention has been described with reference to the preferred embodiments, it will be appreciated that many variations and modifications in the focus voltage correction circuit for cathode ray tubes (CRTs) may be made without departing from the spirit of the invention.

We claim:

1. A focus voltage correction circuit for cathode ray tubes, comprising means for generating a flyback pulse by switching a supply voltage to be applied to a primary side of a flyback transformer, means for rectifying and smoothing said flyback pulse so as to develop a focus voltage in cathode ray tubes, an amplifier and means for applying said supply voltage to said amplifier, a voltage-varying means for producing a variable input voltage in said amplifier from said supply voltage, and means for superimposing an output voltage of said amplifier on said flyback pulse, said voltage-varying means being provided on an input side of said amplifier such that the focus voltage in cathode ray tubes can be variably determined by said output voltage of said amplifier.

2. A focus voltage correction circuit for cathode ray tubes, comprising means for generating a flyback pulse by switching a supply voltage to be applied to a primary side of a flyback transformer, means for rectifying and smoothing said flyback pulse so as to develop a focus voltage in cathode ray tubes, an inversion amplifier and means for applying said supply voltage to said inversion amplifier, and means for superimposing an output of said inversion amplifier on said flyback pulse, thereby to eliminate an error in said focus voltage to be caused by an error in said supply voltage.

3. A focus voltage correction circuit for a cathode ray tube in which a flyback pulse is generated at a secondary side of a flyback transformer by switching a supply voltage to be applied to a primary side of said flyback transformer, the flyback pulse being rectified and smoothed so as to develop a focus voltage in said cathode ray tube; said focus voltage correction circuit comprising an amplifier in which a DC voltage produced from an intermediate tap of a secondary winding of said flyback transformer is applied as the supply voltage and a voltage Vcc supplied to the primary side of said flyback transformer is applied as an input for operation;

said amplifier being connected in a circuit such that an output voltage of said amplifier is supplied to a secondary winding of said flyback transformer;

a variable resistor connected to an input side of said amplifier; and said variable resistor varying an operational DC voltage of the output voltage of said amplifier, thereby to finely adjust the focus voltage.

4. The focus voltage correction circuit according to claim 3, wherein said amplifier comprises a transistor circuit operated by applying a grid voltage in a cathode ray tube produced from an intermediate tap of the secondary side winding of said flyback transformer as a collector side supply voltage, and applying the supply voltage Vcc applied to the primary side of the flyback transformer as a base side input voltage, said transistor circuit comprising a temperature correction diode and a circuit for connecting a resistor for a lower input impedance with a zener diode.

5. A focus voltage correction circuit for a cathode ray tube in which a flyback pulse is generated at a secondary side of a flyback transformer by switching a supply voltage to be applied to a primary side of said flyback transformer, the flyback pulse being rectified and smoothed so as to develop a focus voltage in said cathode ray tube; said focus voltage correction circuit comprising an inversion amplifier in which a DC voltage produced from an intermediate tap of a secondary side winding of said flyback transformer is applied as the supply voltage and a voltage Vcc supplied to the primary side of said flyback transformer is applied as an input for operation;

said inversion amplifier being connected in a circuit such that an voltage of said inversion amplifier is supplied to a secondary winding of said flyback transformer; and means for superimposing on a voltage induced in said secondary side winding an output voltage of said inversion amplifier which is generated and inversely amplified by an error for a reference voltage of said primary side supply voltage, thereby to correct the error of the focus voltage.

6. The focus voltage correction circuit according to claim 5, wherein said inversion amplifier comprises a transistor circuit operated by applying a grid voltage in a cathode ray tube produced from an intermediate tap of the secondary side winding of said flyback transformer as a collector side supply voltage, and applying the supply voltage Vcc applied to the primary side of said flyback transformer as a base side input voltage, and means for taking said inversion output voltage from a load resistor at the collector side.

7. The focus voltage correction circuit according to claim 5, wherein said inversion amplifier comprises a transistor circuit having a temperature correction diode.

8. The focus voltage correction circuit according to claim 7, wherein the transistor circuit comprises a circuit for connecting a resistor for a lower input impedance with a zener diode.

9. The focus voltage correction circuit according to claim 7, further comprising a variable resistor for finely adjusting the operational DC voltage of the output voltage, said variable resistor being connected at the base side of said transistor circuit.

* * * * *